United States Patent
Ali et al.

(10) Patent No.: US 8,543,789 B2
(45) Date of Patent: Sep. 24, 2013

(54) SYSTEM AND METHOD FOR MANAGING A STORAGE ARRAY

(75) Inventors: Ahmad A. J. Ali, Austin, TX (US); Zafar Mahmood, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1071 days.

(21) Appl. No.: 12/115,306

(22) Filed: May 5, 2008

(65) Prior Publication Data

US 2009/0276785 A1    Nov. 5, 2009

(51) Int. Cl.
*G06F 12/16* (2006.01)
*G06F 1/32* (2006.01)

(52) U.S. Cl.
USPC ............................. 711/170; 711/114; 713/324

(58) Field of Classification Search
None
See application file for complete search history.

(56) References Cited

U.S. PATENT DOCUMENTS

| | | | |
|---|---|---|---|
| 2007/0220326 A1* | 9/2007 | Ninose et al. | 714/17 |
| 2008/0071842 A1* | 3/2008 | Tokuda et al. | 707/202 |
| 2008/0168223 A1 | 7/2008 | Reeves et al. | 711/114 |
| 2008/0259710 A1 | 10/2008 | Wenzel et al. | 365/226 |
| 2008/0276042 A1* | 11/2008 | Hetzler et al. | 711/114 |
| 2009/0019246 A1* | 1/2009 | Murase | 711/162 |
| 2009/0083558 A1* | 3/2009 | Sugiki et al. | 713/320 |

OTHER PUBLICATIONS

U.S. Appl. No. 12/038,234, filed Feb. 27, 2008; Confirmation No. 5259; 38 pages.

* cited by examiner

*Primary Examiner* — Kaushikkumar Patel
(74) *Attorney, Agent, or Firm* — Baker Botts L.L.P.

(57) ABSTRACT

Systems and methods for managing a storage array are disclosed. A method may include segmenting each of a plurality of physical storage resources into a first storage area and a second storage area. The method may also include activating a first logical unit including each first storage area of the plurality of physical storage resources. The method may additionally include placing at least one designated physical resource of the plurality of physical storage resources in a powersave mode. The method may further include activating a second logical unit including the second storage areas of some of the plurality of physical storage resources but not the at least one designated physical storage resource. Moreover, the method may include storing data associated with a write operation intended for the at least one designated physical storage resource to the second logical unit.

19 Claims, 3 Drawing Sheets

SYSTEM AND METHOD FOR MANAGING A STORAGE ARRAY

TECHNICAL FIELD

The present disclosure relates in general to data storage, and more particularly to a system and method for managing a storage array.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of physical storage resources, such as a Redundant Array of Independent Disks (RAID), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a server chassis, to hundreds of physical storage resources disposed in one or more separate storage enclosures.

However, one downside of redundant storage arrays is that they generally require at least one physical storage resource within the storage array to serve as a redundant storage resource (e.g. for parity or mirroring). Thus, a redundant storage array typically consumes more power than a non-redundant storage array of similar storage capacity.

A traditional approach to reducing the power requirements of a redundant storage array includes powering down or spinning down one of the physical storage resources of the array. However, powering down one of the physical resources of a storage array may leave the storage array in a "degraded" state, whereby additional write operations to the array could become unrecoverable upon failure of one of the remaining powered-on physical storage resources, thus negating the original purpose of implementing the redundant array.

SUMMARY

In accordance with the teachings of the present disclosure, disadvantages and problems associated with power management in a redundant storage array have been substantially reduced or eliminated.

In accordance with an embodiment of the present disclosure, a method for managing a storage array is provided. The method may include segmenting each of a plurality of physical storage resources into a first storage area and a second storage area. The method may also include activating a first logical unit including each first storage area of the plurality of physical storage resources. The method may additionally include placing at least one designated physical resource of the plurality of physical storage resources in a powersave mode. The method may further include activating a second logical unit including the second storage areas of some of the plurality of physical storage resources but not the at least one designated physical storage resource. Moreover, the method may include storing data associated with a write operation intended for the at least one designated physical storage resource to the second logical unit.

In accordance with an embodiment of the present disclosure, a system for managing a storage array may include a plurality of physical storage resources and a device communicatively coupled to the plurality of storage resources. The device may be configured to segment each of the plurality of physical storage resources into a first storage area and a second storage area. The device may also be configured to activate a first logical unit including each first storage area of the plurality of physical storage resources. The device may additionally be configured to place at least one designated physical resource of the plurality of physical storage resources in a powersave mode. The device may further be configured to activate a second logical unit including the second storage areas of some of the plurality of physical storage resources but not the at least one designated physical storage resource. Moreover, the device may be configured to store data associated with a write operation intended for the at least one designated physical storage resource to the second logical unit.

In accordance with an additional embodiment of the present disclosure, a a program of instructions may be embodied in a tangible computer-readable medium. The program of instructions may be operable to, when executed: (a) segment each of a plurality of physical storage resources into a first storage area and a second storage area; (b) activate a first logical unit including each first storage area of the plurality of physical storage resources; (c) place at least one designated physical resource of the plurality of physical storage resources in a powersave mode; (d) activate a second logical unit including the second storage areas of some of the plurality of physical storage resources but not the at least one designated physical storage resources; and (e) store data associated with a write operation intended for the at least one designated physical storage resource to the second logical unit.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
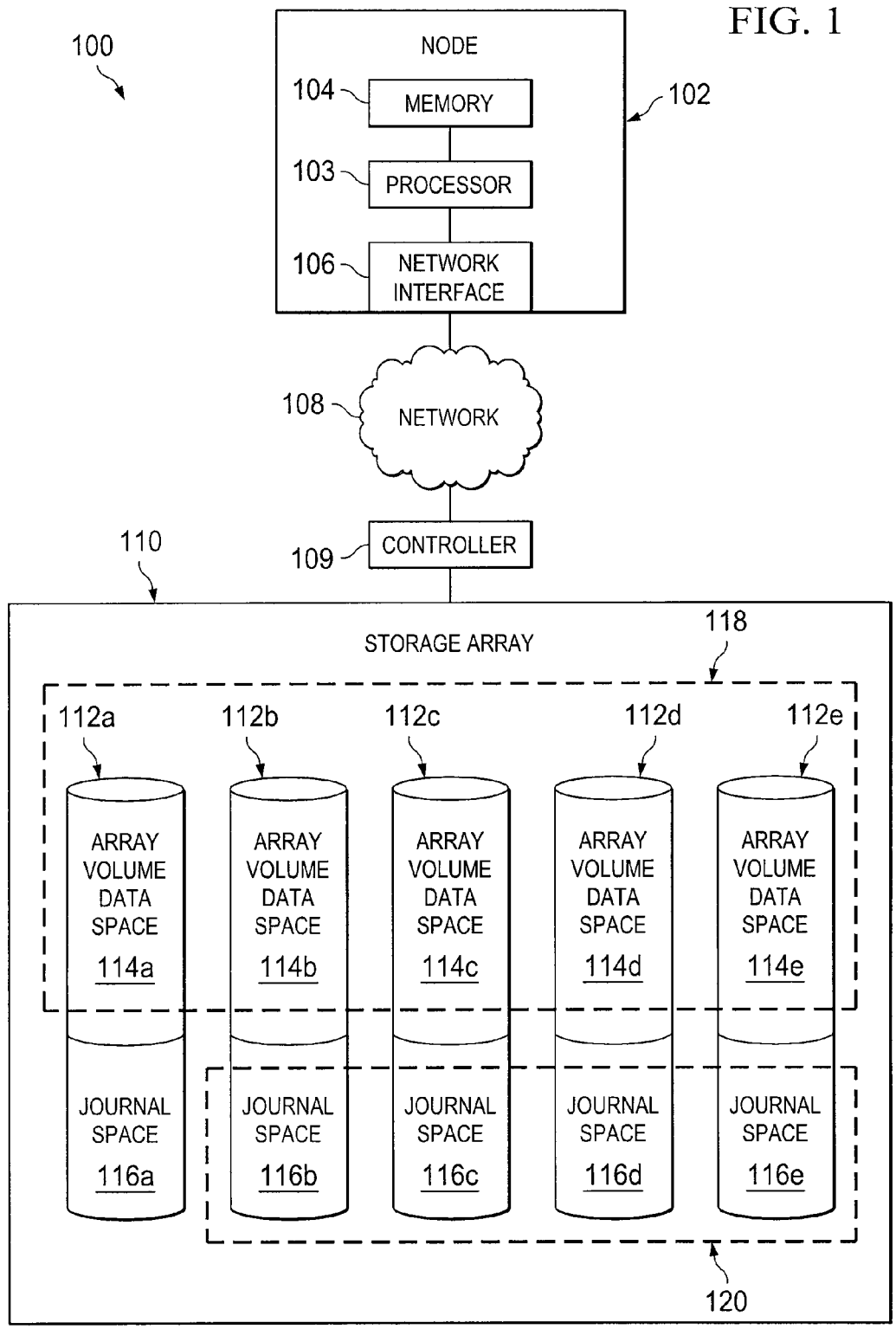
FIG. 1 illustrates a block diagram of an example system including a redundant storage array having enhanced power management features, in accordance with the present disclosure.
Figure 2:
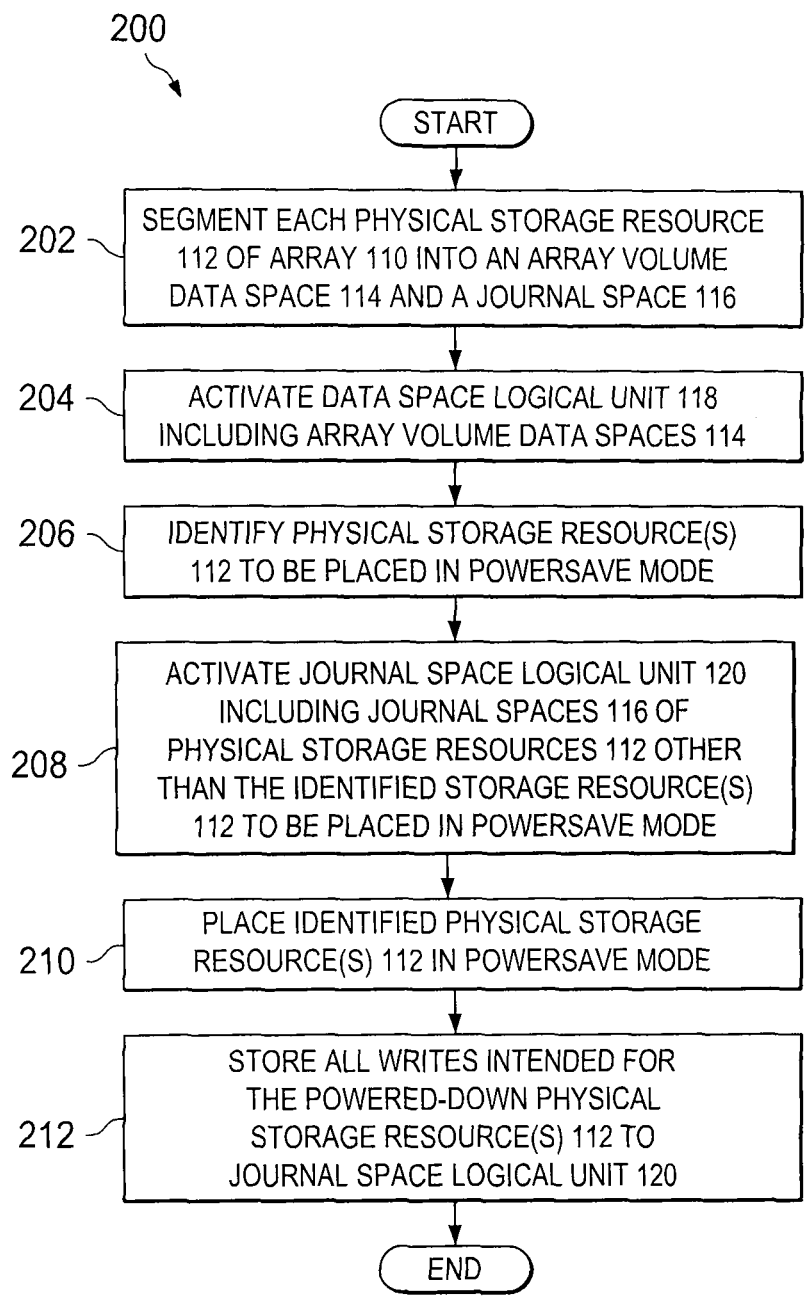
FIG. 2 illustrates a flow chart of an example method for managing the power consumption of a redundant storage array having enhanced power management features, in accordance with the present disclosure.
Figure 3:
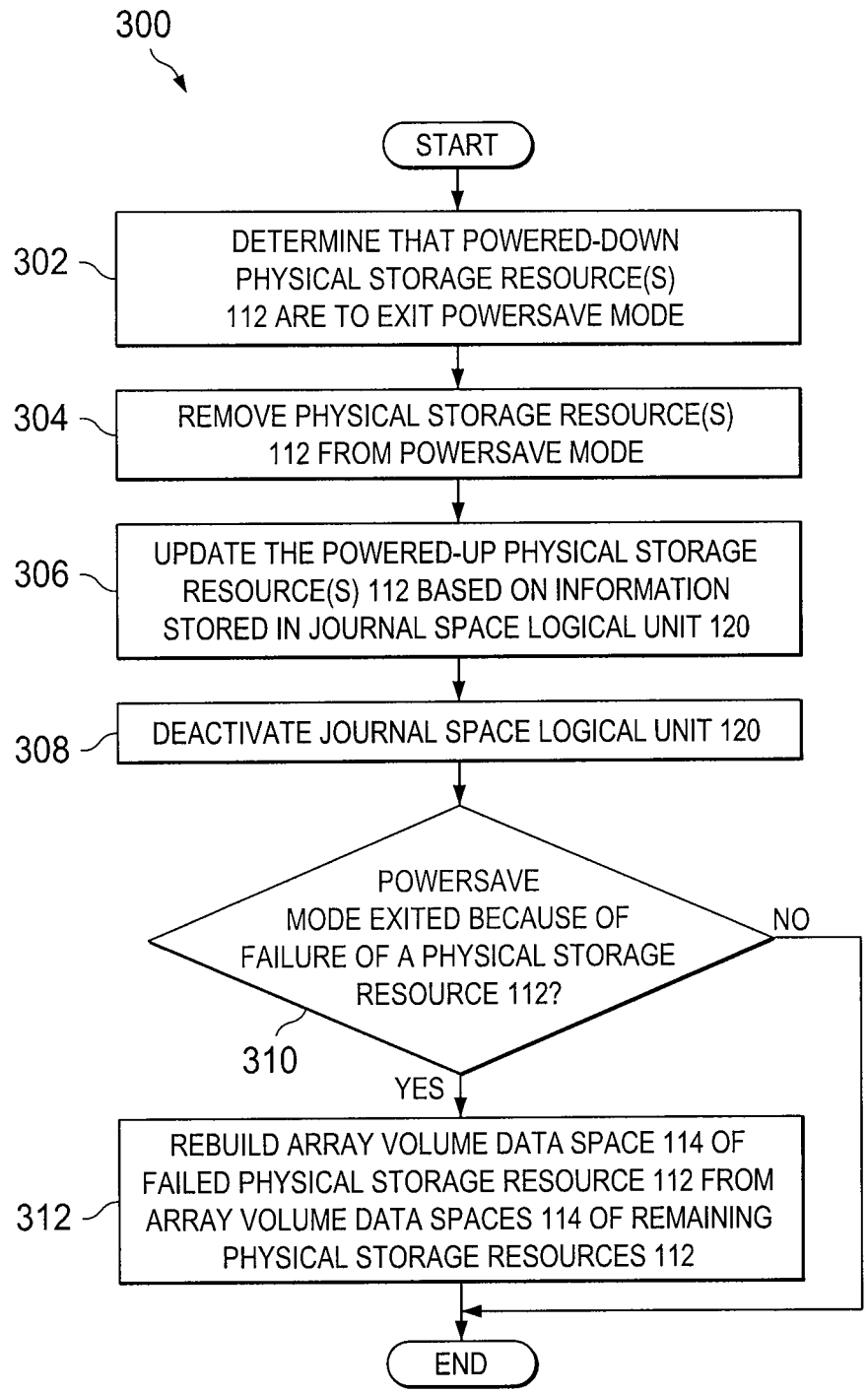
FIG. 3 illustrates a flow chart of an example method for updating a physical storage resource in a storage array having enhanced power management features, in accordance with the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory, as well as communications media such wires, optical fibers, microwaves, radio waves, and other electromagnetic and/or optical carriers; and/or any combination of the foregoing.

As discussed above, an information handling system may include or may be coupled via a network to an array of physical storage resources. The array of physical storage resources may include a plurality of physical storage resources, and may be operable to perform one or more input and/or output storage operations, and/or may be structured to provide redundancy. In operation, one or more physical storage resources disposed in an array of physical storage resources may appear to an operating system as a single logical storage unit or "logical unit."

In certain embodiments, an array of physical storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID levels, including without limitation, standard RAID levels (e.g., RAID 0, RAID 1, RAID 3, RAID 4, RAID 5, and RAID 6), nested RAID levels (e.g., RAID 01, RAID 03, RAID 10, RAID 30, RAID 50, RAID 51, RAID 53, RAID 60, RAID 100), non-standard RAID levels, or others.

FIG. 1 illustrates a block diagram of an example system 100 including redundant storage array 110 having enhanced power management features, in accordance with the present disclosure. As depicted in FIG. 1, system 100 may include a node 102, a network 108, a controller 109, and a storage array 110.

Node 102 may comprise an information handling system and may generally be operable to read data from and/or write data to one of more physical storage resources 112 of storage array 110. In certain embodiments, node 102 may be a server. In other embodiments, node 102 may be a personal computer (e.g., a desktop or portable computer). As depicted in FIG. 1, node 102 may include a processor 103, a memory 104 communicatively coupled to processor 103, and a network interface 106 coupled to processor 103.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of node 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to node 102 is turned off.

Network interface 106 may be any suitable system, apparatus, or device operable to serve as an interface between node 102 and network 108. Network interface 106 may enable node 102 to communicate via network 108 using any suitable transmission protocol and/or standard, including without limitation all transmission protocols and/or standards enumerated below with respect to the discussion of network 108.

Although system 100 is depicted as having one node 102, system 100 may have any number of nodes 102.

Network 108 may be a network and/or fabric configured to communicatively couple node 102 to storage array 110. In certain embodiments, network 108 may allow node 102 to couple physical storage resources 112 such that the physical storage resources 112 and/or logical units comprising physical storage resources 112 appear to node 102 as locally-attached storage resources. In the same or alternative embodiments, network 108 may include a communication infrastructure, which provides physical connections, and a management layer, which organizes the physical connections between network 108, network interface 106 and storage array 100. In the same or alternative embodiments, network 108 may allow block I/O services and/or file access services to physical storage resources 112 disposed in storage array 110.

Network 108 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 108 may transmit data using any communication protocol, including without limitation, Frame Relay, Asynchronous Transfer Mode (ATM), Internet protocol (IP), other packet-based protocol, small computer system interface (SCSI), advanced technology attachment (ATA), serial ATA (SATA), advanced technology attachment packet interface (ATAPI), serial storage architecture (SSA), integrated drive electronics (IDE), and/or any combination thereof. Further, network 108 may transport data using any storage protocol, including without limitation, Fibre Channel, Internet SCSI (iSCSI), Serial Attached SCSI (SAS), or any other storage transport compatible with SCSI protocol. Network 108 and its various components may be implemented using hardware, software, or any combination thereof.

Controller 109 may be any suitable system, device, or apparatus that manages physical storage resources 112 of storage array 110 and/or presents them to node 102 as logical units and/or virtual storage resources (e.g., a RAID controller). For example, if a RAID implemented using the physical storage resources 112 of storage array 110, controller 109 may control how stored data is mirrored and/or striped among physical storage resources 112, and may present such RAID as a single logical unit or virtual storage resource to node 102. In some example embodiments, controller 109 may be an integral part of a storage enclosure housing one or more of physical storage resources 112. In other example embodiments, controller may be an integral part of node 102.

As depicted in FIG. 1, storage array 110 may include one or more physical storage resources 112, and may be communicatively coupled to node 102 and/or network 108, in order to facilitate communication of data between node 102 and physical storage resources 112. Physical storage resources 112 may include hard disk drives, magnetic tape libraries, optical disk drives, magneto-optical disk drives, compact disk drives, compact disk arrays, disk array controllers, and/or any computer-readable medium operable to store data.

As shown in FIG. 1, each physical storage resource 112 may be segmented into (a) a first storage area referred to herein as an array volume data space 114 and (b) a second storage area referred to herein as a journal space 116. For example, each physical storage resource 112 may be partitioned to create array volume data space 114 and journal space 116. As shown in FIG. 1, and as described in greater detail below with respect to FIGS. 2 and 3, a data space logical unit 118 may be activated to include one or more array volume data spaces 114. In certain embodiments, data space logical unit 118 may appear to an operating system executing on node 102 as a single logical storage unit or virtual resource. Thus, node 102 may "see" data space logical unit 118 instead of seeing each individual physical storage resource 112. In such embodiments, data to be written to and/or read from storage array 110 may be respectively written to and/or read from data space logical unit 118.

Also, as shown in FIG. 1, and as described in greater detail below with respect to FIGS. 2 and 3, a journal space logical unit 120 may include journal spaces 116 of some but not all (e.g., all but one) of physical storage resources 112. However, unlike data space logical unit 118, journal space logical unit 120 may not be presented to or "seen" by node 102 as a logical unit in certain embodiments of this disclosure. Instead, information and/or data associated with one or more physical storage resources 112 in a powersave mode may be written to and/or read from journal space logical unit 120 by controller 109, as described in greater detail below with respect to FIGS. 2 and 3.

Although the embodiment shown in FIG. 1 depicts storage array 110 having five physical storage resources 112, storage array 210 may have any number of physical storage resources 112. In certain embodiments, system 100 may include a storage enclosure to hold and power controller 109 and/or one or more physical storage resources 112.

Although FIG. 1 depicts that node 102 is communicatively coupled to storage array 110 via network 108, node 102 may be communicatively coupled to one or more physical storage resources 112 without the need of network 108 or another similar network. For example, in certain embodiments, one or more physical storage resources 112 may be directly coupled and/or locally attached to one or more nodes 102.

FIG. 2 illustrates a flow chart of an example method 200 for managing the power consumption of redundant storage array 110, in accordance with the present disclosure. According to one embodiment, method 200 preferably begins at step 202. As noted above, teachings of the present disclosure may be implemented in a variety of configurations of system 100. As such, the preferred initialization point for method 200 and the order of the steps 202-212 comprising method 200 may depend on the implementation chosen.

At step 202, node 102, controller 109, and/or another suitable component of system 100 may segment each physical storage resource 112 into an array volume data space 114 and a journal space 116. For example, each physical resource 112 may be segmented by creating separate partitions for each of its respective array volume data space 114 and journal space 116. In certain embodiments, the journal space 116 may be implemented using inner disk tracks of each of physical storage resource 112. The relative sizes of each array volume data space 114 and journal space 116 may be selected in any suitable manner. For example, the relative sizes may be predetermined by a manufacturer, a network administrator, information technology technician, and/or another user. In some embodiments, each array volume data space 114 may be of approximately identical size. The same or alternative embodiments, each journal space 116 may be of approximately identical size.

At step 204, controller 109 may activate data space logical unit 118 including array volume data spaces 114. Data space logical unit 118 may be a redundant storage array, and may be implemented using any suitable RAID level. Once activated, data space logical unit 118 may be presented to or "seen" by node 102 as a single logical unit. Accordingly, data to be written and/or read by node 102 by be written and/or read to data space logical unit 118.

At step 206, node 102, controller 109, and/or another suitable component of system 100 may identify one or more physical storage resources 112 to be placed in a powersave mode. The physical storage resource(s) 112 to be placed in the powersave mode may be identified in any suitable manner. For example, the physical storage resources(s) 112 to be placed in a powersave mode may be identified according to an established policy and/or algorithm (e.g., based on a program and/or logic resident on node 102 and/or controller 109) that determines when to place one or more physical storage resource(s) 112 in powersave mode.

At step 208, node 102, controller 109, and/or another suitable component of system 100 may activate journal space logical unit 120 including those journal spaces 116*b-e* of physical storage resources 112*b-e* other than the identified physical storage resource(s) 112 (e.g., physical storage resource 112*a*). Journal space logical unit 120 may be a redundant storage array, and may be implemented using any suitable RAID level. In certain embodiments, journal space logical unit 120 may employ a RAID level different than that of data space logical unit 118. For example, data space logical unit 118 may employ RAID 5, while journal space logical unit 120 employs RAID 10. In certain embodiments, journal space logical unit 120 may not be presented to or "seen" by node 102 as a logical unit. Instead, journal space logical unit 120 may be used to journal or catalog write operations intended for physical storage resource 112*a* while physical storage 112*a* is in powersave mode, as described in further detail below.

At step 210, node 102, controller 109, and/or another suitable component of system 100 may place the identified physical storage resource(s) 112 in a powersave mode. A powersave mode may include any mode and/or state of a physical storage resource 112 in which it may consume less power than if it were operating in a normal mode. For example, placing a physical storage resource 112 in a powersave mode may include spinning it down, placing it in a lower power "standby" or "sleep" state, or removing power from it entirely. For clarity, the remaining discussion of FIG. 2 and FIG. 3 assumes that physical storage resource 112*a* is the identified physical storage resource that is placed in a powersave mode. However, it is understood that any combination of physical storage resources 112*a*-112*e* may be placed in a powersave mode at steps 206-210 in accordance with this disclosure.

At step 212, controller 109 and/or another suitable component of system 100 may store all writes intended for the powered-down physical storage node 112*a* to the journal space logical unit 120. In certain embodiments, writes to journal space logical unit 120 may include a "journaled" write, wherein information regarding the destination of a write may also be written in addition to the data to be written. For example, writes to journal space logical unit 120 may include information regarding the destination sector, track, and/or block of the powered-down physical storage node 112*a* corresponding to data written to journal space logical unit 120. In addition, writes to journal space logical unit 120 may include information regarding the destination physical storage node 112 corresponding to data written to journal space logical unit 120 (e.g., in embodiments where more than one physical storage node 112 is placed in powersave mode).

In the event node 102 issues a read operation to data space logical unit 118 for data stored in powered-down physical storage resource 112*a*, in certain embodiments controller 109 may maintain physical storage resource 112*a* in powersave mode and determine the data to be communicated to node 102 in response to the read operation based on data stored on the remaining physical storage nodes 112*b-e*. For example, when a read operation is made for a particular block of physical storage resource 112*a*, controller 109 may first read journal space logical unit 120 to determine whether the particular block was the destination of a write that occurred after physical storage resource 112*a* was placed in powersave mode. If the particular block was the destination of such a write, controller 109 may respond to the read operation with the relevant data stored in journal space logical unit 120. On the other hand, if such a write has not occurred after physical storage resource 112*a* was placed in powersave mode, any data that existed on array volume data space 114*a* of physical storage resource 112*a* prior to entering power-save mode may be determined based on data present on array volume data spaces 114*b-e*, because of the redundant nature of data space logical unit 118. Accordingly, in such a scenario, controller 109 may respond to the read operation by performing a parity operation or other suitable operation with respect to the relevant data stored in array volume data spaces 114*b-e*.

Although FIG. 2 discloses a particular number of steps to be taken with respect to method 200, it is understood that method 200 may be executed with greater or fewer steps than those depicted in FIG. 2. In addition, although FIG. 2 discloses a certain order of steps to be taken with respect to method 200, the steps comprising method 200 may be completed in any suitable order. Method 200 may be implemented using system 100 or any other system operable to implement method 200. In certain embodiments, method 200 may be implemented partially or fully in software embodied in tangible computer-readable media.

FIG. 3 illustrates a flow chart of an example method 300 for updating a physical storage resource 112 from a powersave mode, in accordance with the present disclosure. According to one embodiment, method 300 preferably begins at step 302. As noted above, teachings of the present disclosure may be implemented in a variety of configurations of system 100. As such, the preferred initialization point for method 300 and the order of the steps 302-312 comprising method 300 may depend on the implementation chosen.

At step 302, node 102, controller 109, and/or another suitable component of system 100 may determine that one or more of the powered-down physical storage resources 112 (e.g., physical storage resource 112*a* in the example discussed with respect to method 200) is to exit powersave mode. For example, a determination to exit a powersave mode may be made based on a policy and/or algorithm that defines when a physical storage resource 112 is to be placed in or removed from powersave mode. In some embodiments, such a policy and/or algorithm may establish a time schedule for placing one or more of physical storage resources 112 in a powersave mode and/or removing them from the powersave mode. In addition or alternatively, a policy and/or algorithm may dictate that a physical storage resource 112 is to be removed from powersave mode when data and information relating to the particular physical storage resource 112 and stored in journal space logical unit 120 has reached a threshold (e.g., a certain percentage of the available storage space of journal space logical unit 120). As a further example, a physical storage resource 112 may be removed from power save mode in the event of a failure of another physical storage resource 112 in the storage array 110.

At step 304, in response to a determination that physical storage resource 112*a* is to exit powersave mode, controller 109 may remove physical storage resource 112*a* from powersave mode (e.g., by returning power to it or issuing a command or message to exit a standby or sleep state).

At step 306, controller 109 and/or another suitable component of system 100 may update the powered-up physical storage resource 112*a* based on information and/or data stored in journal space logical unit 120. For example, physical storage resource 112*a* may be updated based on journaled writes made to journal space logical unit 120 which include the write data along with destination information associated with the write data. At step 308, controller 109 and/or another suitable component of system 100 may deactivate journal space logical unit 120 after updating physical storage resource 112*a*.

At step 310, controller 109 and/or another component of system 100 may determine whether the powersave mode was exited because of a failure of a physical storage resource 112. If the powersave mode was not exited because of a failure of a physical storage resource 112, method 300 may end. However, if the powersave mode was exited because of a failure of a physical storage resource 112, data space logical unit 118 may be in a degraded state and the failed physical drive may need to be replaced and rebuilt. In such a case, method 310 may proceed to step 312.

At step 312, controller 109 and/or another suitable component of system 100 may rebuild array volume space 114 of failed physical storage resource 112 from array volume data spaces 114 of the remaining physical storage resources 112, using any suitable data rebuild process.

Although FIG. 3 discloses a particular number of steps to be taken with respect to method 300, it is understood that method 300 may be executed with greater or fewer steps than those depicted in FIG. 3. In addition, although FIG. 3 discloses a certain order of steps to be taken with respect to method 300, the steps comprising method 300 may be completed in any suitable order. Method 300 may be implemented using system 100 or any other system operable to implement method 300. In certain embodiments, method 300 may be implemented partially or fully in software embodied in tangible computer-readable media.

Although the methods set forth above discuss a specific example whereby physical storage resource 112a is placed in a powersave mode, any combination of one or more physical storage resources 112 may be placed in a powersave mode in accordance with the systems and methods disclosed. For illustrative purposes only, a specific example of an embodiment wherein more than one physical storage resource 112 may be placed in a powersave mode in one in which storage array 110 includes a four-physical storage resource RAID 10 (assume for purposes of this example that physical storage resource 112e is not present). In this example, storage resources 112a-b may be placed in a powersave mode while journal spaces 116c-d comprises the journal space logical unit 120. The journal space logical unit 120 in this embodiment may be a RAID 1.

In addition, in accordance with certain embodiments of the present invention, various physical storage resources 112 in storage array may be placed in and removed from a powersave mode according to a scheduling policy or algorithm. For example, a manufacturer, network administrator, information technology technician, or another user may establish a schedule whereby physical storage resources 112 "take turns" being placed in powersave mode. As a specific example, a network administrator may establish a policy whereby storage resource 112a is placed in powersave mode on Monday, storage resource 112b is placed in powersave mode on Tuesday, storage resource 112c is placed in powersave mode on Wednesday, storage resource 112d is placed in powersave mode on Thursday, storage resource 112e is placed in powersave mode on Friday, and no storage resources are placed in powersave mode on Saturday and Sunday. Under this scenario, storage resource 112a would be placed in powersave mode on Monday in accordance with a method similar to method 200. On Tuesday, storage resource 112a would be removed from powersave mode in accordance with a method similar to method 300, and storage resource 112b would be placed in powersave mode on Monday in accordance with a method similar to method 200, and so on. As another specific example, in an embodiment whereby storage array 110 includes a four-physical storage resource RAID 10 (e.g., without physical storage resource 112e), physical storage resources 112a-112b may be placed in powersave mode on odd-numbered days, and physical storage resources 112c-112d may be placed in powersave mode on even-numbered days.

Using the methods and systems disclosed herein, problems associated conventional approaches to management of power consumption in a storage array may be reduced or eliminated. For example, because the methods and systems disclosed may allow for reduced power consumption in redundant storage arrays by placing one or more physical storage resources in a powersave mode while maintaining the capability to recover from a single physical storage resource failure without data loss.

In addition, the power savings achieved in certain embodiments may significantly outweigh the associated loss of storage capacity required. For example, in a five-physical storage resource RAID 5 logical unit, a user may desire to implement a journal space logical unit that can redundantly store 10% of the capacity of the physical storage resource 112 to be powered down. Such an implementation would require each journal space 116 to use approximately 3⅓% of the storage space of its associated physical storage resource 112 (e.g., if physical storage resource 112a is to be placed in powersave, each of journal spaces 116 would need to be 3⅓% of the storage space of a physical storage resource 112 in order to store 10% of the capacity of physical storage resource 112a while also maintaining redundancy). Thus, in this particular example, a 20% power consumption reduction may be achieved while sacrificing only 3⅓% in storage capacity.

Another potential advantage of certain embodiments disclosed herein is that by reducing the amount of time each physical storage resource 112 in a storage array is fully powered, the mean time before failure (MTBF) of each individual physical storage resource may increase, particularly in embodiments were physical storage resources 112 are placed in powersave mode in a round-robin fashion. Any increase of MTBF for individual physical storage resources 112 may not only decrease the occurrence of physical storage resource failures necessitating the rebuilds thereof, but may also increase the MTBF for the redundant storage array 110 itself, thus providing increased data integrity.

Although the present disclosure has been described in detail, it should be understood that various changes, substitutions, and alterations can be made hereto without departing from the spirit and the scope of the invention as defined by the appended claims.

What is claimed is:

1. A method for managing a storage array, comprising:
segmenting each of a plurality of physical storage resources into a first storage area and a second storage area;
activating a first logical unit including each first storage area of the plurality of physical storage resources;
placing at least one designated physical resource of the plurality of physical storage resources in a powersave mode;
activating a second logical unit including the second storage areas of some of the plurality of physical storage resources but not the at least one designated physical storage resource, wherein neither the second logical unit nor any virtual resource comprising the second logical unit is presented as a logical unit to any node communicatively coupled to the plurality of physical storage resources; and
storing data associated with a write operation intended for the at least one designated physical storage resource to the second logical unit.

2. A method according to claim 1, wherein at least one of the first logical unit and the second logical unit is a redundant storage array.

3. A method according to claim 2, wherein the redundant storage array is a redundant array of inexpensive disks (RAID).

4. A method according to claim 3, wherein each of the first logical unit and the second logical unit is a RAID of the same RAID level.

5. A method according to claim 3, wherein each of the first logical unit and the second logical unit is a RAID, and the first logical unit and the second logical unit are of a different RAID level.

6. A method according to claim 1, wherein storing data associated with the write operation includes storing information associated with the destination of the data to be written.

7. A method according to claim 1, further comprising presenting the first logical unit to a node communicatively coupled to the plurality of physical storage resources as a single logical unit.

8. A method according to claim 1, further comprising:
removing the at least one designated physical storage resource from the powersave mode; and
updating the at least one designated physical storage resource based on information stored in the second logical unit.

9. A system for managing a storage array, comprising:
a plurality of physical storage resources; and
a device communicatively coupled to the plurality of storage resources, the device configured to:
segment each of the plurality of physical storage resources into a first storage area and a second storage area;
activate a first logical unit including each first storage area of the plurality of physical storage resources;
place at least one designated physical resource of the plurality of physical storage resources in a powersave mode;
activate a second logical unit including the second storage areas of some of the plurality of physical storage resources but not the at least one designated physical storage resource, such that neither the second logical unit nor any virtual resource comprising the second logical unit is presented as a logical unit to any node communicatively coupled to the plurality of physical storage resources; and
store data associated with a write operation intended for the at least one designated physical storage resource to the second logical unit.

10. A system according to claim 9, wherein at least one of the first logical unit and the second logical unit is a redundant storage array.

11. A system according to claim 10, wherein the redundant storage array is a redundant array of inexpensive disks (RAID).

12. A system according to claim 11, wherein each of the first logical unit and the second logical unit is a RAID of the same RAID level.

13. A system according to claim 11, wherein each of the first logical unit and the second logical unit is a RAID, and the first logical unit and the second logical unit are of a different RAID level.

14. A system according to claim 9, the device further configured to store information associated with the destination of the data to be written.

15. A system according to claim 9, the device further configured to present the first logical unit to a node communicatively coupled to the plurality of physical storage resources as a single logical unit.

16. A system according to claim 9, the device further operable to:
remove the at least one designated physical storage resource from the powersave mode; and
update the at least one designated physical storage resource based on information stored in the second logical unit.

17. A system according to claim 9, wherein the device comprises a controller.

18. A program of instructions embodied in a non-transitory computer-readable medium and operable to, when executed:
segment each of a plurality of physical storage resources into a first storage area and a second storage area;
activate a first logical unit including each first storage area of the plurality of physical storage resources;
place at least one designated physical resource of the plurality of physical storage resources in a powersave mode;
activate a second logical unit including the second storage areas of some of the plurality of physical storage resources but not the at least one designated physical storage resources, such that neither the second logical unit nor any virtual resource comprising the second logical unit is presented as a logical unit to any node communicatively coupled to the plurality of physical storage resources; and
store data associated with a write operation intended for the at least one designated physical storage resource to the second logical unit.

19. A program of instructions according to claim 18, further operable to:
remove the at least one designated physical storage resource from the powersave mode; and
update the at least one designated physical storage resource based on information stored in the second logical unit.

* * * * *